US010284561B2

(12) United States Patent
Kwon et al.

(10) Patent No.: US 10,284,561 B2
(45) Date of Patent: May 7, 2019

(54) METHOD AND SERVER FOR PROVIDING IMAGE CAPTCHA

(71) Applicant: Korea University Research and Business Foundation, Seoul (KR)

(72) Inventors: Shinil Kwon, Seoul (KR); Sungdeok Cha, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 366 days.

(21) Appl. No.: 15/208,737

(22) Filed: Jul. 13, 2016

(65) Prior Publication Data
US 2017/0019407 A1    Jan. 19, 2017

(30) Foreign Application Priority Data
Jul. 13, 2015 (KR) .................. 10-2015-0099369

(51) Int. Cl.
*H04L 29/06* (2006.01)
*G06K 9/00* (2006.01)
*G06F 21/36* (2013.01)

(52) U.S. Cl.
CPC ............. *H04L 63/10* (2013.01); *G06F 21/36* (2013.01); *G06K 9/00442* (2013.01); *H04L 63/083* (2013.01); *G06F 2221/2133* (2013.01)

(58) Field of Classification Search
CPC ........ H04L 63/10; H04L 63/083; G06F 21/36
See application file for complete search history.

(56) References Cited

U.S. PATENT DOCUMENTS

| 9,317,676 | B2* | 4/2016 | Liu ................... G06F 17/30247 |
| 2009/0235327 | A1* | 9/2009 | Jakobsson ............... G06F 21/31 726/2 |
| 2010/0325706 | A1* | 12/2010 | Hachey ................. H04L 9/3271 726/6 |
| 2011/0208716 | A1* | 8/2011 | Liu ................... G06F 17/30247 707/710 |
| 2013/0019278 | A1* | 1/2013 | Sun ......................... G06F 21/36 726/2 |

(Continued)

FOREIGN PATENT DOCUMENTS

KP   1020110129010 A   12/2011
KR   1020120095603 A    8/2012

*Primary Examiner* — Morshed Mehedi
(74) *Attorney, Agent, or Firm* — Fox Rothschild LLP

(57) ABSTRACT

A method of providing an image Completely Automatic Public Turing test to tell Computers and Humans Apart (CAPTCHA), and a server thereof. The method includes: outputting an image CAPTCHA including a plurality of images including a determination object image; receiving an image selection from the image CAPTCHA; determining whether a test of the image CAPTCHA is passed, based on the received image selection; and determining what the determination object image means. The images include a first group of images used to determine whether an accessing party passes the image CAPTCHA test and a second group of images unused to determine whether the accessing party passes the image CAPTCHA test. The second group includes the determination object image. The determining of the pass of the image CAPTCHA test is performed by selecting an image representing a correct or incorrect answer from the first group.

12 Claims, 6 Drawing Sheets

(56) References Cited

U.S. PATENT DOCUMENTS

| | | | | |
|---|---|---|---|---|
| 2013/0145441 A1* | 6/2013 | Mujumdar | ............ | G06F 21/305 726/5 |
| 2015/0319153 A1* | 11/2015 | Tartz | ....................... | H04L 63/08 726/4 |
| 2015/0348017 A1* | 12/2015 | Allmen | ................ | G06Q 20/367 705/76 |
| 2016/0261586 A1* | 9/2016 | Huang | .................... | G06T 11/60 |

* cited by examiner

METHOD AND SERVER FOR PROVIDING IMAGE CAPTCHA

CROSS-REFERENCE TO RELATED APPLICATIONS

A claim for priority under 35 U.S.C. § 119 is made to Korean Patent Application No. 10-2015-0099369 filed Jul. 13, 2015, in the Korean Intellectual Property Office, the entire contents of which are hereby incorporated by reference.

BACKGROUND

Statement of Technical Field

The present disclosure relates to a method and a server for providing an image CAPTCHA. More particularly, the present disclosure relates to a method and a server for providing an image CAPTCHA which are capable of automatically determining a meaning of an image based on an image selection of an accessing party from the image CAPTCHA.

Description of Related Art

A CAPTCHA (Completely Automated Public Turing test to tell Computers and Humans Apart), which is an automated turing test, is made for the purpose of determining whether a currently accessing party is a human being. Malicious users sending e-mail spam attempt to secure a plurality of e-mail accounts by utilizing a robot automatically performing a predetermined work, but the CAPTCHA prevents such an attempt by generating tests that humans can pass but robots (or computer programs) cannot. The CAPTCHA is mainly utilized in web portal sites such as Google® and Bing® when confirming whether or not a user is human in a process of providing a resource such as an e-mail account. An image-based CAPTCHA introduced to improve problems of a character-based CAPTCHA mainly is a question of putting an interpretation on a meaning of an image, so that an ideal CAPTCHA may be implemented because there is a great difference between the image interpretation (recognition) abilities of human beings and robots.

An image meaning determining and searching system (such as Google® image search or Bing® image search) according to the related art operates in such a manner that it searches for an image and a text from web pages and analyzes and conjectures the found text and image. However, even though a word is expressed in the same text, the word may have various meanings so that the meaning of the word may be ambiguous (for example, a phrase of 'a true good scene'). In addition, since an image has several meanings, it may be difficult to express the image as a single text (for example, a phrase of 'Baekdu-san mountain scene together with one's lover'). Further, when several photographs exist, it may be ambiguous to determine which photograph a text relates to. Thus, accuracy of a conventional scheme in which a text is analyzed to interpret an image is lower than that of a scheme in which human beings directly determines a meaning of an image.

SUMMARY

The present disclosure concerns a method and a server for providing an image CAPTCHA, which provide the image CAPTCHA including an image unused to determine whether an accessing party is a human being and automatically determines what the image means based on the image selected by the accessing party, thereby making it possible to determine more exactly the meaning of an image at the minimum cost and by the minimum effort.

The present disclosure also concerns a method of providing an image Completely Automatic Public Turing test to tell Computers and Humans Apart (CAPTCHA), which is performed by a server for providing an image CAPTCHA. The method includes: outputting an image CAPTCHA including a plurality of images including a determination object image; receiving an image selection from the image CAPTCHA; determining whether a test of the image CAPTCHA is passed, based on the received image selection; and determining what the determination object image means. The plurality of images includes a first group of images used to determine whether an accessing party passes the test of the image CAPTCHA. A second group of images are not used to determine whether the accessing party passes the test of the image CAPTCHA. The second group includes the determination object image. The determining of the test pass of the image CAPTCHA is performed by selecting an image representing a correct answer or an incorrect answer from the first group.

The present disclosure further concerns a server for providing an image Completely Automatic Public Turing test to tell Computers and Humans Apart (CAPTCHA). The server includes: an interface unit configured to output an image CAPTCHA including a plurality of images including a determination object image and to receive an image selection from the output image CAPTCHA; and a control unit configured to determine whether an accessing party passes a test of the image CAPTCHA according to the received image selection and to determine what the determination object image means according to whether the accessing party passes the test. The plurality of images includes a first group of images used to determine whether the accessing party passes the test of the image CAPTCHA. A second group of images are not used to determine whether the accessing party passes the test of the image CAPTCHA. The determining of the test pass of the image CAPTCHA is performed by selecting an image from the first group.

BRIEF DESCRIPTION OF THE FIGURES

The above and other objects and features will become apparent from the following description with reference to the following figures.

DETAILED DESCRIPTION

The objects, features and advantages of the disclosure will appear more fully upon consideration of the illustrative embodiments now to be described in detail with the accompanying drawings. Accordingly, the technological concepts of may be easily understood by one skilled in the art. It should be understood that the description herein will be given of essential parts required to understand operations according to this specification and description of the other parts will be omitted to obviate obscurity of the point of the invention. Hereinafter, embodiments will be described in detail with reference to accompanying drawings.

Figure 1:
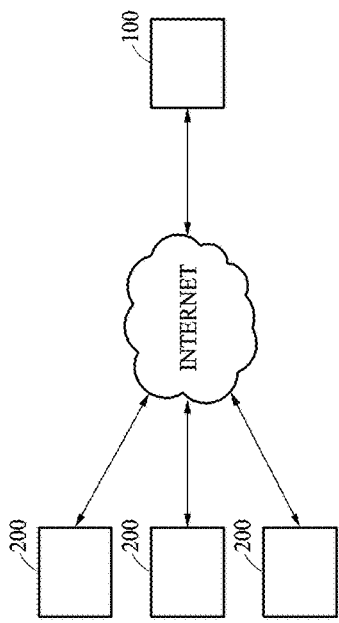
FIG. 1 is a view illustrating a system for providing an image CAPTCHA.

FIG. 1 is a view illustrating a system for providing an image CAPTCHA.

Referring to FIG. 1, a system for providing an image CAPTCHA includes at least one accessing party apparatus 200 and a server 100 for providing an image CAPTCHA. In some scenarios, the accessing party apparatus 200 and the image CAPTCHA providing server 100 may be connected to each other through Internet and may transmit and receive various kinds of data.

Reviewing in brief each system block through one example of a system of providing an image CAPTCHA, the accessing party apparatus 200 may be connected to a server or other devices through Internet and may transmit/receive various kinds of data through Internet. For example, the accessing party apparatus 200 may include a personal computer, a mobile phone, a smart phone, a tablet PC, a specific-purpose server, etc. The accessing party apparatus 200 may access the image CAPTCHA providing server 100 to use a specific function provided from the server 100.

For example, the accessing party apparatus 200 may be an apparatus used to initially subscribe to the image CAPTCHA providing server 100 by a user or a robot trying to subscribe to the image CAPTCHA providing server 100 through a program installed thereto in order to maliciously utilize a function of the image CAPTCHA providing server 100. The malicious robot is programmed to obtain a plurality of accounts by analyzing the images of image CAPTCHAs through a test wasting attack.

The image CAPTCHA providing server 100 provides a server-purpose function to a subscribed or registered user. For example, the image CAPTCHA providing server 100 may be an e-mail server, a portal server, or a cloud server. The image CAPTCHA providing server 100 is configured to output an image CAPTCHA and determine whether the accessing party apparatus 200 is a human being, based on the selection from the images of the output image CAPTCHA. When a user passes the image CAPTCHA test, the image CAPTCHA providing server 100 may provide an account and a specific function or service to the user. In addition, the image CAPTCHA providing server 100 may analyze information about the image selection and the test pass to determine the meaning of the image. In this case, the image CAPTCHA providing system 100 may further include a separated image determination apparatus (not shown). The separated image determination apparatus may include a reception unit configured to receive the information about the selection and test pass of the accessing party apparatus 200 for the image to be determined by the image CAPTCHA server 100, and a determination unit configured to determine the meaning of the image to be determined by analyzing the received information.

The accessing party apparatus 200 and the image CAPTCHA providing server 100 may transmit various kinds of requests and response data through Internet according to the communication protocol of Internet protocol. The accessing party apparatus 200 transmits a request of securing an account to the image CAPTCHA providing server 100, and the image CAPTCHA providing server 100 provides an image CAPTCHA including a plurality of images to the accessing party apparatus 200 in response to the request. As the image CAPTCHA server 100 receives the selection of the accessing party apparatus 200 from the provided image CAPTCHA and data or a response corresponding to the selection, the image CAPTCHA server 100 may determine whether the accessing party apparatus 200 passes the test and whether the user of the accessing party apparatus 200 is a human being, so that the image CAPTCHA providing server 100 provides an account to the accessing party apparatus 200 according to the determination result.

The image CAPTCHA providing server 100 may variously interface with the accessing party apparatus 200. For example, the image CAPTCHA providing server 100 may operate as a web server that provides a web page. The image CAPTCHA providing server 100 may be configured to transmit a web page to the accessing party apparatus 200 and receive data corresponding to the selection of the accessing party apparatus 200 from the images displayed on the web page.

Hereinafter, an image CAPTCHA generated, a detailed control, and a data flow performed by utilizing the image CAPTCHA will be described in detail with reference to the accompanying drawings.

Figure 2:
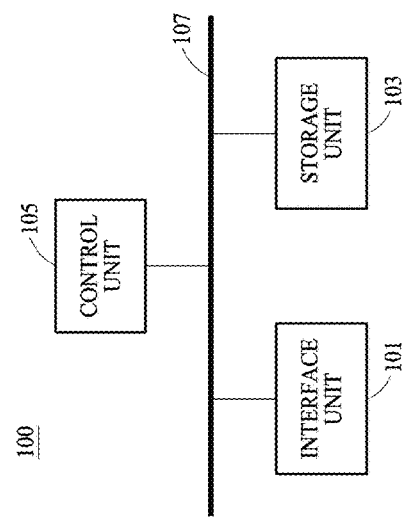
FIG. 2 is a block diagram illustrating a server for providing an image CAPTCHA.

FIG. 2 is a block diagram illustrating the image CAPTCHA server 100. Referring to FIG. 2, the image CAPTCHA providing server 100 may include an interface unit 101, a storage unit 103, a control unit 105, a connection unit 107 and additional other units. FIG. 2 is a functional block diagram.

Referring to FIG. 2, the interface unit 101 is connected to Internet to transmit/receive data to/from at least one accessing party apparatus 200. For example, the interface unit 101 may transmit data corresponding to an image CAPTCHA to the accessing party apparatus 200 and may receive data corresponding to the selection of the accessing party apparatus 200 from the images included in the image CAPTCHA. To transmit/receive data, the interface unit 101 includes a chip set capable of performing wire local area communication such as Ethernet communication or wireless local area communication such as Wi-Fi communication.

The storage unit 103 stores various kinds of data. The storage unit 103 includes at least one mass storage medium such as a volatile memory, a non-volatile memory or a hard disk. The storage unit 103 temporarily stores various kinds of data and programs by using a volatile memory and stores a system setting and a system program (such as a booting program) by using a non-volatile memory. The storage unit 103 stores various kinds of images, log data, and programs by using a mass storage medium such as a hard disk.

The images stored in the storage unit 103 may be used to constitute or generate an image CAPTCHA. Although the images are collected at least through Internet, the images may be determined as correct or incorrect answers to specific questions or not yet. The programs stored in the storage unit 103 include a program for providing a server-purpose function, and a program for generating an image CAPTCHA and managing images and log data. For example, when an account is generated, a program related to the image CAPTCHA generation may be invoked such that an image CAPTCHA question is transmitted to the accessing party apparatus 200.

The control unit 105 controls each block of the image CAPTCHA providing server 100. The control unit 105 includes an execution unit capable of executing a program code. In some scenarios, the control unit 105 loads the program code stored in the storage unit 103 to control each block according to the program. The control unit 105 includes at least one CPU or MPU.

In this case, it is possible to allow a separated control unit to control a partial step (block). Control units may interwork with each other to control the image CAPTCHA server 100. In detail, a step related to the image determination (for example, step S111 of FIG. 3 or steps S211 to S213 of FIG. 4 described below) may be performed by a separated control unit.

The control unit 105 may interwork with the interface unit 101 to transmit/receive various kinds of data to/from the accessing party apparatus 200. The control unit 105 may be configured to perform a function assigned to the image CAPTCHA providing server 100 and perform a function corresponding to a request from the accessing party apparatus 200. In this case, the control 105 is required to determine whether the accessing party apparatus 200 is a human being. For example, the control unit 105 generates an image CAPTCHA and outputs the image CAPTCHA through the interface unit 101 to determine whether the accessing party apparatus 200 is a human being. The control unit 105 receives the selection of the accessing party apparatus 200 from the image CAPTCHA through the interface unit 101 and determines whether the accessing party apparatus 200 is a human being according to the received selection such that a new account is provided to the accessing party apparatus 200 according to the determination result.

A control process performed in the control unit 105 will be described in detail with reference to FIGS. 3 and 4.

The connection unit 107 allows data to be transmitted/received between the blocks. The connection unit 107 is configured to transmit data of a block to the control unit 105 and transmit data generated from the control unit 105 to a block under control of the control unit 105. For example, the connection unit 107 includes a parallel bus.

The blocks of the image CAPTCHA providing server 100 of FIG. 2 may be embedded in a single structure or be distributed into plural structures and embedded in them, respectively. In addition, the control unit 105 may be divided and embedded in plural structures. A form of the connection unit 107 may be changed according to the image CAPTCHA providing server 100.

Figure 3:
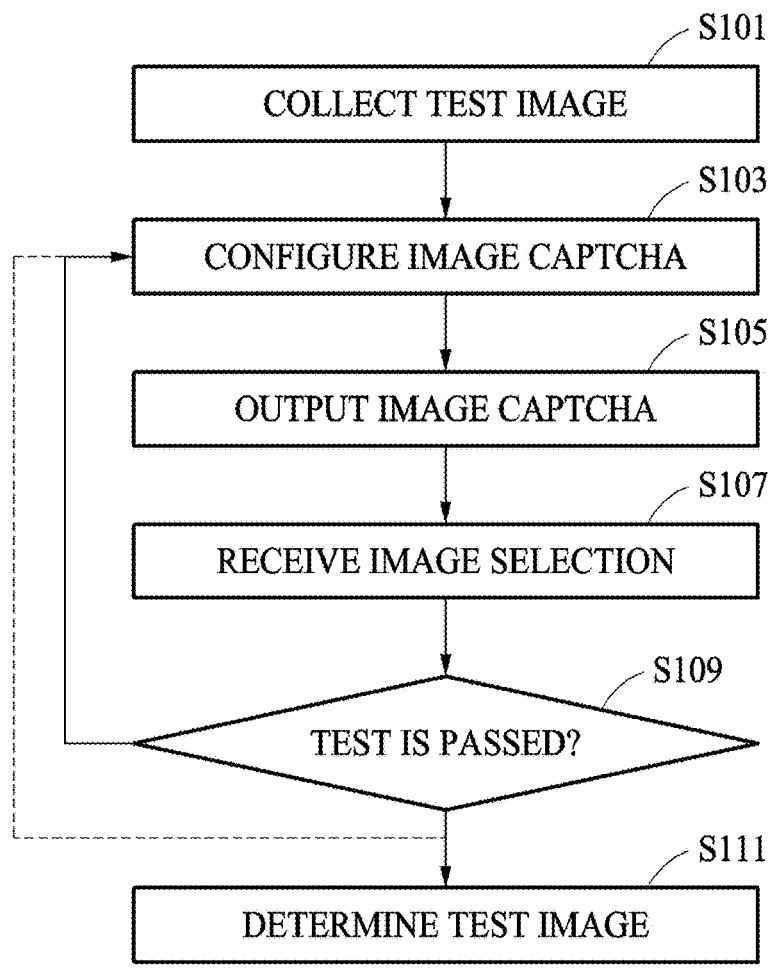
FIG. 3 is a flowchart illustrating a method of providing an image CAPTCHA to determine a meaning of a new image which is not determined.

FIG. 3 is a flowchart illustrating a method of providing an image CAPTCHA to determine a meaning of a new image which is not determined. The control flow of FIG. 3 is performed by the image CAPTCHA providing server 100. In some scenarios, the control unit 105 of the image CAPTCHA providing server 100 loads a program stored in the storage unit 103 to control the interface unit 101 and the storage unit 103 according to the program code such that the control unit 105 performs the control process. The control and data flows between the interworking blocks will be described in detail below.

First, in step S101, the control unit 105 of the image CAPTCHA providing server 100 periodically collects new images through on-line or off-line and stores the collected images in the storage unit 103. The step S101 may be performed independently from other steps.

In step S103, the control unit 105 of the image CAPTCHA providing server 100 configures an image CAPTCHA according to a request (for example, a request of generating an account) of the accessing party apparatus 200 through the interface unit 101. The image CAPTCHA includes a plurality of images and a question which is a reference for selecting the images.

First, the images of the image CAPTCHA, which all are correct or incorrect answer images, are configured to be unable to recognize identification. In detail, the image CAPTCHA includes a group (hereinafter, referred to as a 'first group') of images used to determine whether the accessing party passes the test and a group (hereinafter, referred to as a 'second group') of images unused to determine whether the accessing party passes the test. Hereinafter, an image of the second group will be referred to as a 'neutral image'.

An image of the first group is a correct or incorrect answer image previously classified. Differently from the image CAPTCHAs known in the art, since the image CAPTCHA includes all the images of the first and second groups, even when passing the test, the identifications of each image may be hidden. An image (neutral image) of the second group may be a correct or incorrect answer image previously classified or a new image not classified. The neutral image of the image CAPTCHA does not serve as the identification of a correct or incorrect answer. Thus, even though the accessing party apparatus 200 passes the image CAPTCHA test, it is impossible to determine correct or incorrect answer identifications of each image due to the neutral image. Since the test pass is determined by some (the image of the first group) of the images without regard to whether a neutral image is selected, it is impossible to verify the identifications of the images so that a test wasting attack may be prevented.

That is, since the image CAPTCHA includes the neutral image, even though the accessing party apparatus 200 selects the incorrect answer image from the neutral images, the accessing party apparatus 200 may pass the test. After a robot mistakes the neutral image for an correct or incorrect answer, the robot may do the same selection for the corresponding image (although the image is a neutral image before, but the image may be selected as an image of the first group) in future, so that the image is utilized as a resource for protecting the robot.

The neutral image disturbs an attempt to infer the identification of an image. Since it does not exert an influence on the result whether the neutral image is selected, the neutral image is utilized to determine identification of an image which is newly collected and will be described below.

The image CAPTCHA includes at least one test image which is desired to determine the image and designated as a neutral image. The test image is an image which is not interpreted yet, that is, is desired to determine the meaning among images, the meanings of which are not determined. The test image may be a new image collected through on-line or off-line (See step S101).

After configuring the image CAPTCHA, in step S105, the control unit 105 of the image CAPTCHA providing server 100 outputs the image CAPTCHA to the accessing party apparatus 200 through the interface unit 101. The output image CAPTCHA includes a question and a plurality of images which include the image(s) of the first group and the image(s) of the second group (neutral) including at least one test image.

Figure 5:
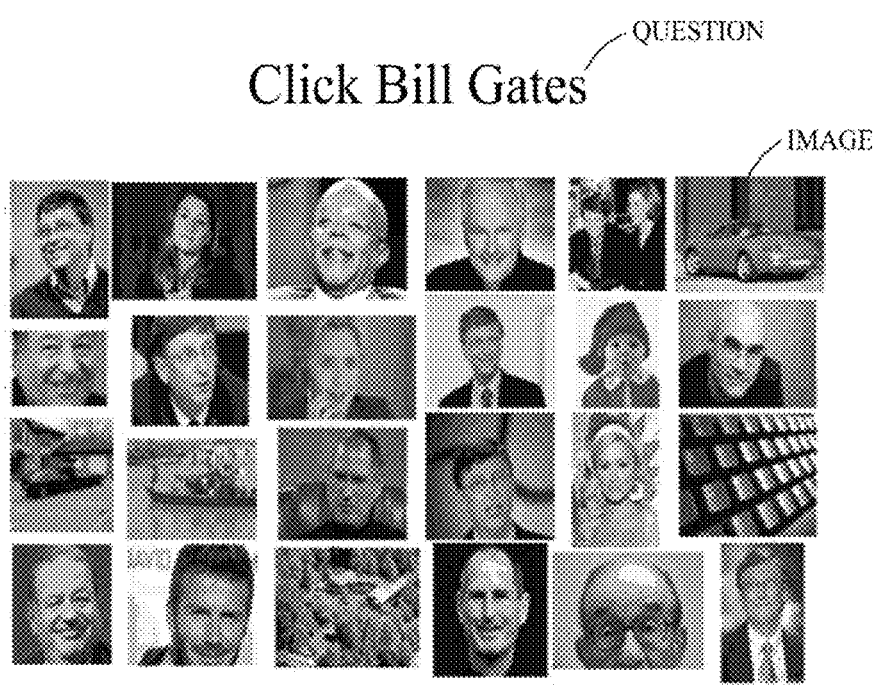
FIG. 5 is a view showing one example of an image CAPTCHA which is output to and displayed on an accessing party apparatus.

FIG. 5 is a view showing one example of an image CAPTCHA which is output to and displayed on the accessing party apparatus 200. As shown in FIG. 5, the accessing party apparatus 200 receives the image CAPTCHA through Internet and displays the received image CAPTCHA thereon. A user or robot of the accessing party apparatus 200 selects a plurality of images included in the image CAPTCHA according to the question and transmits the data corresponding to the image selection to the image CAPTCHA providing server 100 through Internet.

The control unit 105 of the image CAPTCHA providing server 100 receives the data corresponding to the image selection from the accessing party apparatus 200 through the interface unit 101 in step S107, and determines whether the accessing party apparatus 100 passes the image CAPTCHA test based on the received image selection (image selection from the first group) in step S109. The images used to determine the test pass are limited to the images of the first group. Without regard to whether the selection from the images of the second group is a correct or incorrect answer, the test pass is determined by selecting a correct or incorrect answer from the images of the first group. As the determination result, the control unit 105 approves or rejects the request (for example, of generating a new account) of the accessing party apparatus 200.

In addition, the control unit 105 stores the data representing the image selection and whether the test is passed in the storage unit 103 as log data. The data stored as the log data may include data on the question, identifiers of images, whether each image of the identifiers is selected, the number of selections of each image, the number of non-selection of each image, the number of CAPTCHAs including each image, whether an image is included in the first or second group, or whether an image CAPTCHA test is passed. The data on whether the test is passed may be stored corresponding to each image CAPTCHA output and thus, the probability of the test pass may be stored as log data.

Figure 6:
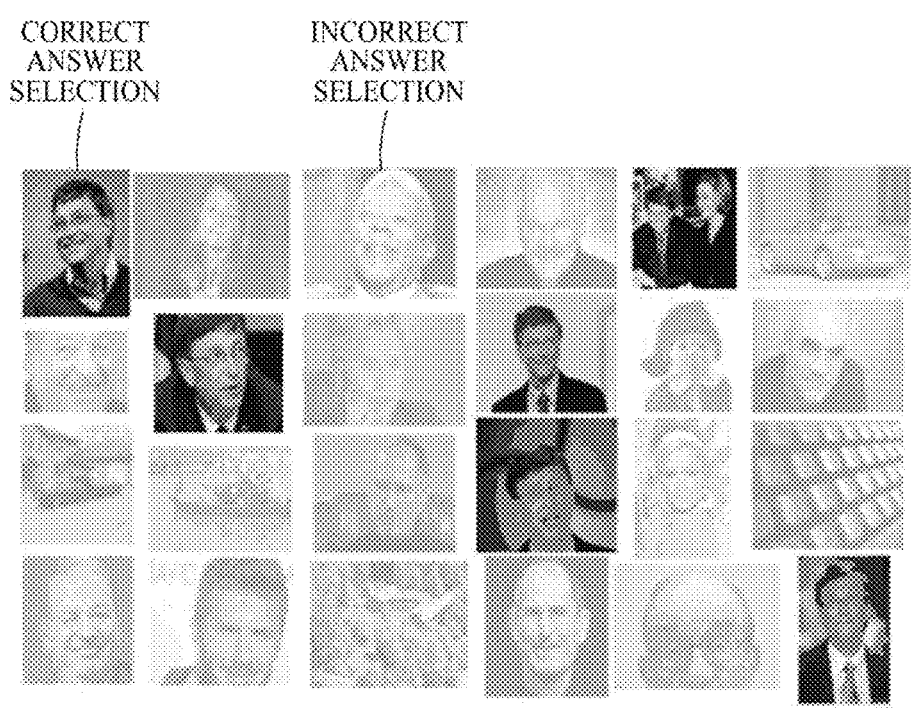
FIG. 6 is a view illustrating a scheme of passing a test of an image CAPTCHA according to the related art.
Figure 7:
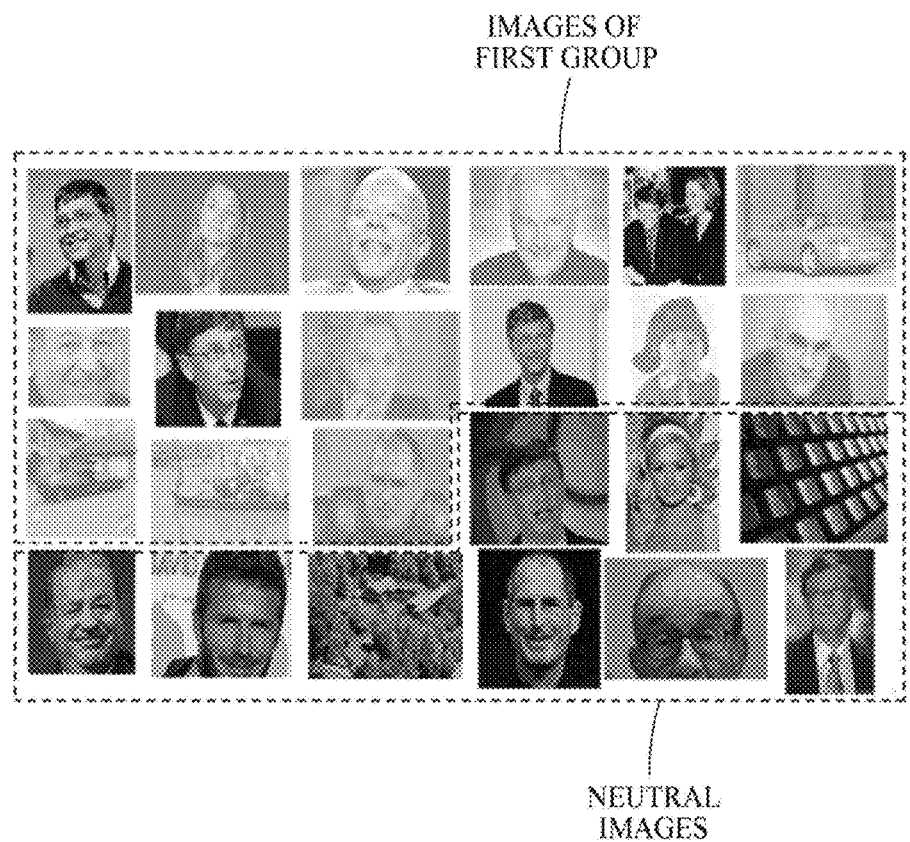
FIG. 7 is a view illustrating a scheme of passing a test of an image CAPTCHA.

FIG. 6 is a view illustrating a scheme of passing a test of an image CAPTCHA according to the related art. FIG. 7 is a view illustrating a scheme of passing a test of an image CAPTCHA.

As shown in FIG. 6, according to a scheme of passing a test of an image CAPTCHA well known in the related art, if all correct answer images are selected and any incorrect answer images are not selected, the test is passed. When the accessing party apparatus 200 passes the test, all the identifications of the output images are exposed to the accessing party apparatus 200.

To the contrary, as shown in FIG. 7, the first group images are used to determine whether the test is passed through the selection of a correct or incorrect answer, and the second group (neutral) images including at least one test image are not used to determine whether the test is passed. Thus, even when a neutral image is incorrectly selected, the accessing party apparatus 200 may pass the test so that it is impossible to expose the identifications of the images as the test pass result.

If the image CAPTCHA test is passed, the control unit 105 of the image CAPTCHA providing server 100 determines the test image in step S111. Only the log data on the test pass are used to determine the meaning of the test image. In case of a test pass, since the accessing party apparatus 200 is a human being or the possibility is great, the meaning of the corresponding question of the corresponding image may be determined as the selection of the accessing party apparatus 200, which passes the test, for the correct or incorrect answer of the corresponding test image is received. For example, when the accessing party apparatus 200 passes a test of requesting to select a person 'Bill Gates' by selecting a correct test image(s) as the correct answer, the possibility that the test image(s) are 'Bill Gates' is great.

In step S111, the meaning of the test image may be determined by selecting the test image several times. That is, when the sufficient log data are stored in the storage unit 103, the control unit 105 may finally determine the meaning (correct or incorrect answer) of the test image by utilizing the log data. In detail, the control unit 105 repeatedly performs the steps S103 to S109 such that the control unit 105 collects a plurality of data representing whether the accessing party apparatus 200 passing the test selects the test image. When the collected data on the selection maintain a predetermined degree of homogeneity, the control unit 105 may determine the meaning of the test image based on the collected data in step S111.

For example, when the accessing party apparatus 200 passes the image CAPTCHA test and the probability (the number of selecting a corresponding test image after passing the test/the number of performing the image CAPTCHA including the corresponding test image and passing the test) of selecting the test images of the second group as a correct answer is higher than a predetermined first determination reference probability (for example, 80%), the control unit 105 determines the meaning of the corresponding test image as a correct answer image of the corresponding question.

In addition, after the accessing party apparatus 200 passes the image CAPTCHA test, when the probability of selecting a test image as a correct answer is less than a predetermined second determination reference probability (for example, 20%), the control unit 105 determines the meaning of the corresponding test image as an incorrect answer of the corresponding question.

After the accessing party apparatus 200 passes a test, when the probability of selecting a test image as a correct answer is less than the first determination reference probability and is greater than the second determination reference probability, the control unit 105 defers determining the meaning of a correct or incorrect answer. In this case, the control unit 105 disposes the corresponding image as a test image again and repeatedly performs steps S103 to S109 and S111, such that the control unit 105 may collect data on the selection of the corresponding image and determine the meaning. When the number of the determinations of the test image of step S111 exceeds a predetermined reference number and the test image is not determined as a correct or incorrect answer image, the control unit 105 may stop allowing the corresponding test image to be included in an image CAPTCHA question and remove the corresponding image. For example, when the reference number is set as '1', and, as the result of performing the image determining step once, it is difficult to determine whether the answer is correct or incorrect, the control unit 105 may delete the corresponding test image. The reference number may be preset by an administrator.

Differently from the scenario described above, the first determination reference probability may be equal to the second determination reference probability. In this case, when the probability of selecting a test image is greater than the first (or second) determination reference probability, the control unit 105 determines the test image as the correct answer. In addition, when the probability of selecting a test image is less than the first (or second) determination reference probability, the control unit 105 determines the test image as an incorrect answer.

That is, to increase the accuracy of the image determination, the control unit 105 may determine the meaning of at least one test image desired to be determined based on plural selections from the accessing party apparatus 200 which has passed the test several times.

Thus, the control unit 105 may determine the meaning of a new image, which is not automatically determined without intervention of a human being, by using the neutral image including the test image. In addition, since the accessing party (determined as a human being), which passes the test through an image CAPTCHA, is directly asked a question about whether the meaning proposed through the corresponding image is correct and the answer is received, as compared with a scheme of determining a meaning of a text-based image according to the related art, the possibility that an error occurs may be reduced and the meaning of an image may be more exactly determined. In addition, the determined meaning may be used to configure an image CAPTCHA in future.

As described above, the steps S103 to 109 are repeated and the storage unit 103 continuously stores the log data from several accessing party apparatus 200 therein. In this case, the images of the image CAPTCHA output through the steps S103 to S105 may be different from those of a previous image CAPTCHA. In addition, the first group images of a previous image CAPTCHA may be output as a neutral image in future. To the contrary, the neutral image may be output as an image of the first group in future.

Differently from the scenario, the step S111 of determining a test image may be performed by a separated image determination apparatus. In detail, the reception unit of the image determination apparatus receives information about the test image selection and the test pass from the image CAPTCHA providing server 100, which is stored according to the result of performing the steps S103 to S109, and the determination unit of the determination apparatus determines the meaning of the test image by using the received information.

Figure 4:
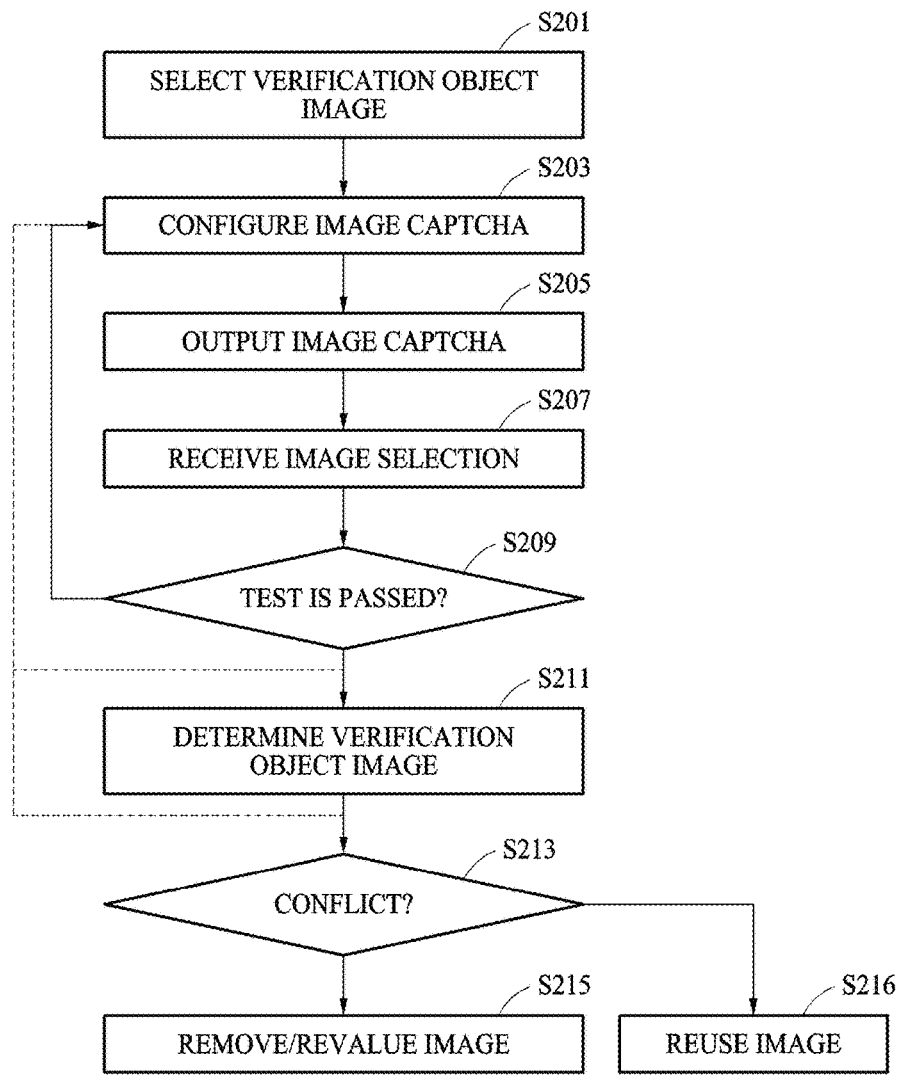
FIG. 4 is a flowchart illustrating a method of providing an image CAPTCHA to verify accuracy of a determination result.

FIG. 4 is a flowchart illustrating a method of providing an image CAPTCHA to verify accuracy of the meaning determined in FIG. 3. The control flow of FIG. 4 is performed by the image CAPTCHA providing server 100. In some scenarios, the control unit 105 of the image CAPTCHA providing server 100 loads a program stored in the storage unit 103 and controls the interface unit 101 and the storage unit 103 according to the code of the program such that the control flow is performed. In this case, control and data flows interworking with each block will be described in detail. In following description about the control flow of FIG. 4, the same parts as those described above will be in brief described.

First, the control unit 105 selects at least one verification object image desired to verify the accuracy of the determined meaning. In this case, the verification object image includes the image of which the meaning is determined through the process of FIG. 3. Differently from the scenario, it is possible to select, as the verification object image, the image of which the meaning is determined through another scheme.

The control unit 105 may automatically select the verification object image according to a predetermined reference. The control unit 105 may select another image as the verification object image according to the predetermined reference, where the predetermined reference may be arbitrarily set by an administrator.

For example, the predetermined reference may be the probability selected by a correct or incorrect answer. In detail, an image determined as a correct answer of a specific question is provided to an image CAPTCHA and an image, of which the probability (the selected number of the corresponding image as a correct answer/the performed number of CAPTCHA) that the image is selected as a correct answer is less than a predetermined first verification object selection reference probability (for example, 80%), may be selected as the verification object image. Alternatively, an image, of which the probability that the image is not selected as a correct answer (or incorrect answer) is greater than a predetermined second verification object selection reference probability (for example, 20%), may be selected.

Likewise, an image determined as an incorrect answer of a specific question is provided to an image CAPTCHA and an image, of which the probability that the image is selected as an incorrect answer (or is not selected as a correct answer) is less than a predetermined third verification object selection reference probability (for example, 80%), may be selected as the verification object image.

In addition, the predetermined reference may be a predetermined time period (for example, 30 days) after the meaning of the corresponding image is determined and the image may be selected as a verification object image after the predetermined time period is elapsed. Alternatively, it is possible to set, as the predetermined reference, the number of questions about the corresponding image included in an image CAPTCHA, that is, the number of questions about the corresponding image which is applied to an image CAPTCHA while being included in the first group as the identification of a correct (or incorrect) answer. When the number of questions of the corresponding image exceeds a predetermined number (for example, 100 times), the corresponding image may be selected as the verification object image.

An administrator may arbitrarily select a verification object image.

In step S203, the control unit 105 configures an image CAPTCHA including a verification object image (the meaning of which is determined through FIG. 3) according to a request of generating an account from the accessing party apparatus 200 through the interface unit 101.

The configured image CAPTCHA includes an image of the first group used to determine the test pass and an image of the second group (neutral). At least one verification object image for verifying the accuracy of the determined meaning is included in the image CAPTCHA and is disposed as a neutral image.

In step S205, the control unit 105 outputs the image CAPTCHA including images and a question to the accessing party apparatus 200 through the interface unit 101.

In step S207, the control unit 105 receives data representing an image selection from the accessing party apparatus 200 through the interface unit 101. The received data representing an image selection are stored in the storage unit 103 as control log data of the control unit 105.

Then, in step S209, the control unit 105 determines whether the image CAPTCHA test is passed based on the received image selection (the selection of an image form the first group). The images used to determine whether the test is passed are limited to those in the first group. As the result of the test pass in step S209, the control unit 105 may generate a new account and informs the accessing party apparatus 200 of the generated account through the interface unit 101.

When the accessing party apparatus 200 passes the image CAPTCHA test, the control unit 105 determines the verification object image in step S211. To increase the accuracy of the image determination, the control unit 105 may determine the meaning of the verification object image based on plural selections from the accessing party apparatus 200 which has passed the test several times.

Next, in step S213, the control unit 105 compares the meaning determined through step S211 with the previous meaning (which is determined through step S111 of FIG. 3) of the verification object image such that the control unit 105 determines whether the meanings conflict with each other. In detail, when the verification object image meaning a correct (incorrect) answer of a specific question has the same meaning, it is determined that there is no conflict between the meanings. When it is determined that the verification object image has a different meaning, it is determined that inflict occurs between the meanings of the image.

In this case, the control unit 105 may determine whether conflict occurs based on the result of determining an image several times in step S211. In some scenarios, when the verification object image is determined based on the selection once in step S211, the control unit 104 may determine whether conflict occurs based on plural determination results in step S213. That is, when the accessing object apparatus 200 passes the image CAPTCHA test, the control unit 105 determines at least one verification object image as a correct or incorrect answer image based on the selection of the accessing object apparatus 200 in step S211. When plural determination results collected by repeating steps S203 to S211 maintain a predetermined degree of homogeneity, based on it, the control unit 105 may determine whether the determination results conflict with the previous determination result of the verification object image or the previous identification in step S213.

For example, when the accessing party apparatus 200 passes the image CAPTCHA test and the probability that the verification object image meaning a correct (incorrect) answer of a specific question is determined as an incorrect (correct) answer in step S211 is less than a predetermined first conflict reference probability (for example, 20%), the control unit 105 determines that conflict does not occur.

In addition, when the probability that the verification object image meaning a correct (incorrect) answer of a specific question is determined as an incorrect (correct) answer is greater than the first conflict reference probability, the control unit 105 determines that conflict occurs. In this case, only when the probability that the verification object image meaning a correct (incorrect) answer is determined as an incorrect (correct) answer is less than a second conflict reference probability (for example, 80%), the control unit 105 determines that conflict occurs. When the probability that the verification object image meaning a correct (incorrect) answer is determined as an incorrect (correct) answer is greater than the first conflict reference probability and less than the second conflict reference probability, the control unit 105 may defer determining whether conflict occurs.

When the control unit 105 may defer determining whether conflict occurs, the control unit 105 disposes the corresponding image as a verification object image again and repeats steps S203 to S211, such that the control unit 105 may determine the meaning of the corresponding image again and may determine whether the meaning of the corresponding image conflicts with the previous determination result again. When the number of the conflict determinations of step S213 exceeds a predetermined reference number and it is not determined whether the conflict of the verification object image occurs, the control unit 105 may stop to allow the verification object image to be included in an image CAPTCHA question and remove the corresponding image. For example, when the reference number is set as '1', and, as the result of performing the image conflict determining step of step S213 once, if it is difficult to determine whether conflict occurs or not, the control unit 105 may delete the corresponding verification object image. The reference number may be preset by an administrator.

Lastly, in steps S215 and S216, the control unit 105 may remove, reuse or revalue the verification object image according to whether conflict occurs. That is, when any conflict does not occur, the determination result of the corresponding image is maintained as it is and reuses the corresponding image for an image CAPTCHA base on the determined meaning.

When conflict occurs, the corresponding verification object image may be removed. Alternatively, when conflict occurs, it is possible to revalue the corresponding verification object image after removing the determined meaning of the corresponding verification object image. For example, after removing the determined meaning of the corresponding verification object image, the image having no determined meaning may be stored as a test image of FIG. 3, and the meaning may be determined according to a scheme of providing an image CAPTCHA of FIG. 3.

That is, to increase the accuracy of the image determination result verification, the control unit 105 may determine the meaning of the verification object image based on plural selections from the accessing party apparatus 200 which has passed the test several times. In addition, the control unit 105 may determine whether the meaning of the verification object image conflicts with the previous determination result. As the result, the control unit 105 may remove, reuse or revalue the corresponding image.

The steps S203 to S216 may be repeated according to the request of the accessing party apparatus 200 and as repeated, the storage unit 103 continuously stores the log data from several accessing party apparatus 200 therein.

Thus, the control unit 105 may determine the meaning of the determined image without intervention of a human being, and may suitably apply the meaning which is changed as time is elapsed or the condition is changed by repeating the verification.

Differently from the scenario, the step S211 of determining a test image may be performed by a separated image determination apparatus. In detail, the reception unit of the image determination apparatus receives information about the verification object image selection and the test pass from the image CAPTCHA providing server 100, which is stored according to the result of performing the steps S203 to S209, and the determination unit of the determination apparatus determines the meaning of the verification object image by using the received information. In addition, the step S213 of determining whether the conflict of the verification object image occurs may be performed by the image determination apparatus.

According to the image CAPTCHA, the image desired to determine the meaning is disposed as a neutral image, so that the meaning of the image may be automatically determined based on whether the accessing party (human being) which has passed the test selects the image desired to determine the meaning. In addition, according to the image CAPTCHA, the meaning determined image is disposed as a neutral image such that the meaning of the image is determined again and the meaning conflicts with a previous determined meaning, so that the accuracy of the image determination may be improved. Further, even when the test including the image CAPTCHA is passed, it is impossible to expose the identifications of the each image.

According to the method and server for providing an image CAPTCHA, the meaning of an image may be exactly determined and the determined image may be verified by using the image CAPTCHA including a neutral image without intervention of a human being.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method of providing an image Completely Automatic Public Turing test to tell Computers and Humans Apart (CAPTCHA), which is performed by a server for providing an image CAPTCHA, the method comprising the steps of:
(a) outputting an image CAPTCHA comprising a plurality of images including a first group of images and a second group of images, the second group of images comprising a determination object image which has not yet been considered as a correct answer image or an incorrect answer image for a corresponding question;
(b) receiving an image selection for the image CAPTCHA;
(c) determining whether a test of the image CAPTCHA is passed based on the received image selection; and
(d) determining whether the determination object image should be considered a correct answer image or an incorrect answer image for the corresponding question based at least on the received image selection for the first group of images and results of the determination as to whether the test is passed;
wherein the first group of images is used to determine whether an accessing party passes the test of the image CAPTCHA and the second group of images is unused to determine whether the accessing party passes the test of the image CAPTCHA;
wherein the second group of images comprises the determination object image; and
wherein the determining of the test pass of the image CAPTCHA is performed by selecting an image representing a correct answer or an incorrect answer from the first group.

2. The method of claim 1, wherein, when the accessing party passes the test of the image CAPTCHA, the determination of (d) is further based on whether the accessing party selects the determination object image.

3. The method of claim 1, wherein the determination of (d) is further based on selections generated by repeating the output of the image CAPTCHA, the receiving of the selected image, and the determining of the test pass.

4. The method of claim 2, wherein the determination object image comprises an image which is not interpreted.

5. The method of claim 2, further comprising: (e) verifying the determination of (d) is correct by repeating the steps (a) through (d).

6. A server, comprising:
a processor;
a non-transitory computer-readable storage medium comprising programming instructions that are configured to cause the processor to implement a method for providing an image Completely Automatic Public Turing test to tell Computers and Humans Apart (CAPTCHA), wherein the programming instructions comprise instructions to:
(a) output an image CAPTCHA comprising a plurality of images including a first group of images and a second group of images, the second group of images comprising a determination object image which has not yet been considered as a correct answer image or an incorrect answer image for a corresponding question;
(b) receive an image selection for the image CAPTCHA;
(c) determine whether a test of the image CAPTCHA is passed according to the received image selection for the first group of images; and
(d) determine whether the determination object image should be considered a correct answer image or an incorrect answer image for the corresponding question based at least on the received image selection for the first group of images and results of the determination as to whether the accessing party passes the test;
wherein the first group of images is used to determine whether the accessing party passes the test of the image CAPTCHA and the second group of images is unused to determine whether the accessing party passes the test of the image CAPTCHA;
wherein the second group of images comprises the determination object image; and
wherein the determining of the test pass of the image CAPTCHA is performed by selecting an image from the first group.

7. The server of claim 6, wherein the programming instructions further comprise instructions to
store log data representing the determination object image selection and whether the accessing party passes the test, and
make the determination of (d) further based on the stored log data.

8. The server of claim 6, wherein, when the accessing party passes the test of the image CAPTCHA, the determination of (d) is further based on whether accessing party selects the determination object image.

9. A method of determining an image, which is performed by an apparatus for determining an image using an image Completely Automatic Public Turing test to tell Computers and Humans Apart (CAPTCHA), the method comprising:
(a) receiving information (1) about a selection of a determination object image from an image CAPTCHA comprising the determination object image and (2) about whether an accessing party passes a test, where the determination object image has not yet been considered as a correct answer image or an incorrect answer image for a corresponding question; and
(b) determining whether the determination object image should be considered a correct answer image or an incorrect answer image for the corresponding question based on the received information;
wherein the image CAPTCHA comprises a first group of images used to determine whether the accessing party passes the test of the image CAPTCHA and a second group of images unused to determine whether the accessing party passes the test of the image CAPTCHA; and
the second group comprises the determination object image.

10. The method of claim 9, wherein, when the accessing party passes the test of the image CAPTCHA, the determining of (b) is performed further based on whether the accessing party selects the determination object image.

11. An apparatus, comprising:
a processor;
a non-transitory computer-readable storage medium comprising programming instructions that are configured to cause the processor to implement a method for determining an image using an image Completely Automatic Public Turing test to tell Computers and Humans Apart (CAPTCHA), wherein the programming instructions comprise instructions to:

(a) receive information (1) about a selection of a determination object image from an image CAPTCHA comprising the determination object image and (2) about whether an accessing party passes a test, where the determination object image has not yet been considered as a correct answer image or an incorrect answer image for a corresponding question; and (b) determine whether the determination object image should be considered a correct answer image or an incorrect answer image for the corresponding question based on the received information;

wherein the image CAPTCHA comprises a first group of images used to determine whether the accessing party passes the test of the image CAPTCHA and a second group of images unused to determine whether the accessing party passes the test of the image CAPTCHA; and the second group comprises the determination object image.

12. The apparatus of claim 11, wherein, when the accessing party passes the test of the image CAPTCHA, a determination of (b) is made further based on whether the accessing party selects the determination object image.

* * * * *